(12) United States Patent
Smith

(10) Patent No.: US 7,218,277 B1
(45) Date of Patent: May 15, 2007

(54) ANTENNA FAILURE DETECTION

(75) Inventor: Mark Dean Smith, Glendale, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 0 days.

(21) Appl. No.: 11/274,067

(22) Filed: Nov. 14, 2005

(51) Int. Cl.
*H01Q 3/00* (2006.01)

(52) U.S. Cl. ...................... 342/359; 342/113

(58) Field of Classification Search ............... 342/113, 342/147, 173, 359, 417; 455/8
See application file for complete search history.

(56) References Cited

U.S. PATENT DOCUMENTS

| | | | |
|---|---|---|---|
| 5,191,349 A * | 3/1993 | Dinsmore et al. | 343/751 |
| 6,329,947 B2 * | 12/2001 | Smith | 342/418 |
| 6,480,522 B1 | 11/2002 | Hoole et al. | |
| 6,690,321 B1 * | 2/2004 | Blatt | 342/126 |
| 6,792,058 B1 | 9/2004 | Hershey et al. | |
| 6,795,772 B2 | 9/2004 | Lin et al. | |
| 6,799,114 B2 | 9/2004 | Etnyre | |
| 2003/0093187 A1 | 5/2003 | Walker | |
| 2006/0009909 A1 * | 1/2006 | Smith | 701/301 |

* cited by examiner

*Primary Examiner*—Dao L. Phan
(74) *Attorney, Agent, or Firm*—Alex Starkovich; Allen J. Moss; Squire, Sanders & Dempsey LLP

(57) ABSTRACT

The present invention provides an apparatus, method, and computer-executable program for detecting antenna failures in directional antennas. In particular, the present invention compares a bearing calculated from received positional data concerning a target to the bearing of the target determined using the directional antenna. If the calculated bearing and the determined bearing differ by greater than a predetermined amount, it is determined that there is an antenna failure. In this way, bearing information determined by the directional antenna is compared against a piece of known data in order to determine if the antenna is functioning properly.

39 Claims, 6 Drawing Sheets

ANTENNA FAILURE DETECTION

FIELD OF THE INVENTION

The present invention relates to the detection of antenna failures, and more particularly to an apparatus, method, and computer-executable program for detecting antenna failures in directional antennas.

BACKGROUND OF THE INVENTION

Conventional directional antennas, such as a Traffic Alert Collision Avoidance System (TCAS) directional antenna, are used in commercial, military, and private aircraft applications to detect and warn of potential collisions with other air traffic. Typically, such directional antenna systems include some apparatus for detecting failures in the antenna. For example, conventional directional antennas may employ internal test circuitry that is used to detect failures in the antenna and to ensure that the cables are correctly attached.

FIG. 1 shows an example of a layout of such a circuit. The schematic of this circuitry is shown in FIG. 2. The function of the test circuitry is centered on four resistors that can be sensed by a computer unit. Each resistor has a different resistance value so that each channel of the directional antenna has a unique DC characteristic for ease in detection and isolation of failure. However, these resistors are isolated by the use of capacitors so that each channel can be sensed independently. As such, when one of the capacitors or solder joints fails as an open circuit, detection by a DC continuity check becomes difficult. This results in an undetected failure mode of the antenna. The result of this undetected capacitor or solder joint failure is radiation pattern degradation. Such degradation can be the cause of traffic being displayed in the wrong location on the pilot's display. While the bearing of an intruder aircraft is not used to determine any resolution advisory information, the pilot's confidence in a system possibly displaying incorrect information may be eroded.

Other solutions for antenna failure detection have made use of detecting the voltage standing wave ratio (VSWR) of the antenna ports and characterizing what VSWR values relate to a failed capacitor (open circuit). Unfortunately, VSWR detectors typically have large indeterminate zones where they are not reliable in detecting an out of specification VSWR. In addition, as VSWR detectors are typically located in a computer unit (which is typically further isolated from the antenna by a cable with 2–3 dB attenuation), even more uncertainty is added.

SUMMARY OF THE INVENTION

In view of the foregoing, the present invention provides an apparatus, method, and computer-executable program for detecting antenna failures in directional antennas. In particular, the present invention compares a bearing calculated from received positional data concerning a target aircraft to the bearing of the target aircraft determined using the directional antenna. If the calculated bearing and the determined bearing differ by greater than a predetermined amount it is determined that there is an antenna failure. In this way, bearing information determined by the directional antenna is compared against another source of positional data in order to determine if the antenna is functioning properly. As such, antenna failures may be detected more precisely and with better confidence.

According to one embodiment, the invention provides a method of detecting a failure of a directional antenna. The method comprises the steps of receiving positional data concerning a target, calculating a bearing to the target with the received positional data, determining a bearing of the target utilizing directional reception, generating an offset bearing, the offset bearing being the difference between the calculated bearing and the determined bearing, and informing of an antenna failure in the case that the bearing offset is greater than a predetermined error threshold.

According to another embodiment, the invention provides a method that comprises the steps of receiving a plurality of positional data points concerning a target, calculating a plurality of bearings to the target with the received positional data points, and determining a plurality of bearings of the target utilizing directional reception. The method further includes the steps of generating a plurality of bearing offsets, the bearing offsets being the difference between the calculated bearings and the determined bearings, and informing of an antenna failure in the case that a current bearing offset differs from a previously generated bearing offset by an amount greater than a predetermined error threshold. The current bearing offset and the previously generated bearing offset may be consecutively generated bearing offsets or the previously generated bearing offset may have been calculated further back in time. In addition, rather than comparing single bearing offsets, a running average of current bearing offsets may be compared to a running average of previously generated bearing offsets.

The above-described method may be carried out with a program stored on a computer-readable medium or with an apparatus, as will be discussed in more detail below.

It is to be understood that the descriptions of this invention herein are exemplary and explanatory only and are not restrictive of the invention as claimed.

DESCRIPTION OF THE EMBODIMENTS

Reference will now be made in detail to the present exemplary embodiments of the invention, examples of which are illustrated in the accompanying drawings.

Figure 1:
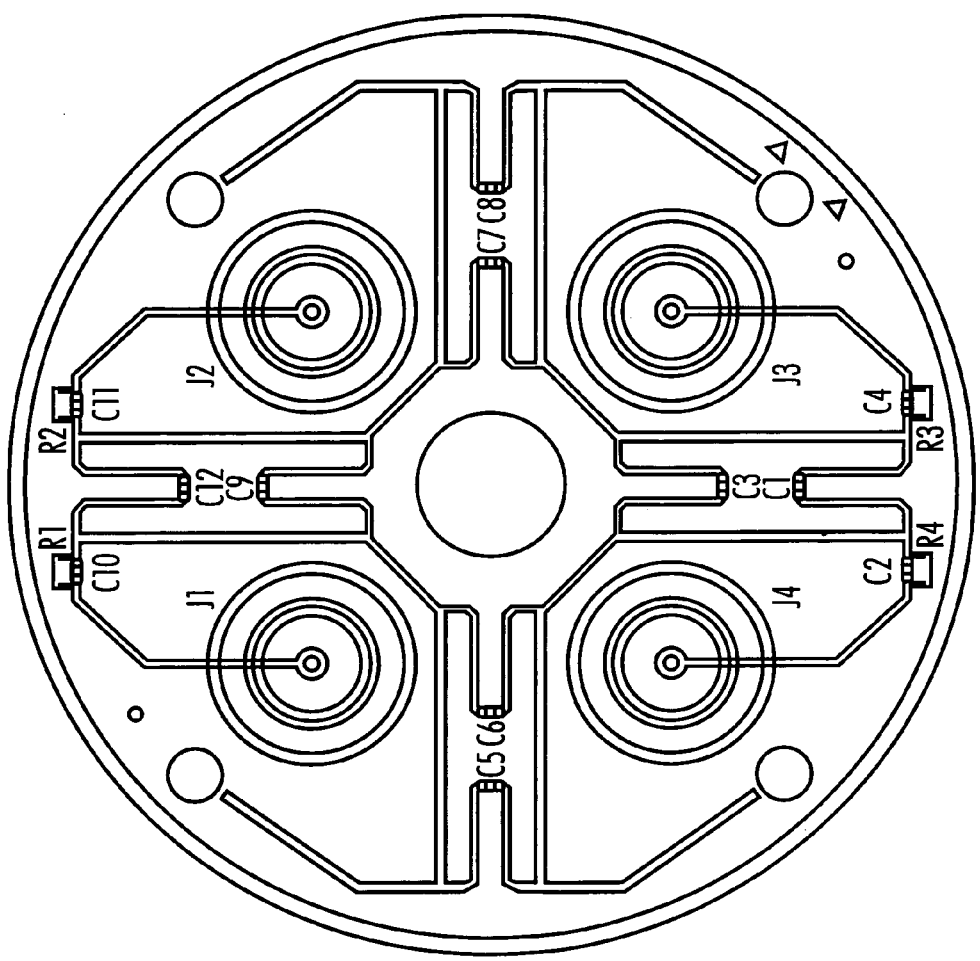
FIG. 1 depicts a circuit layout of a conventional antenna failure detection circuit.
Figure 2:
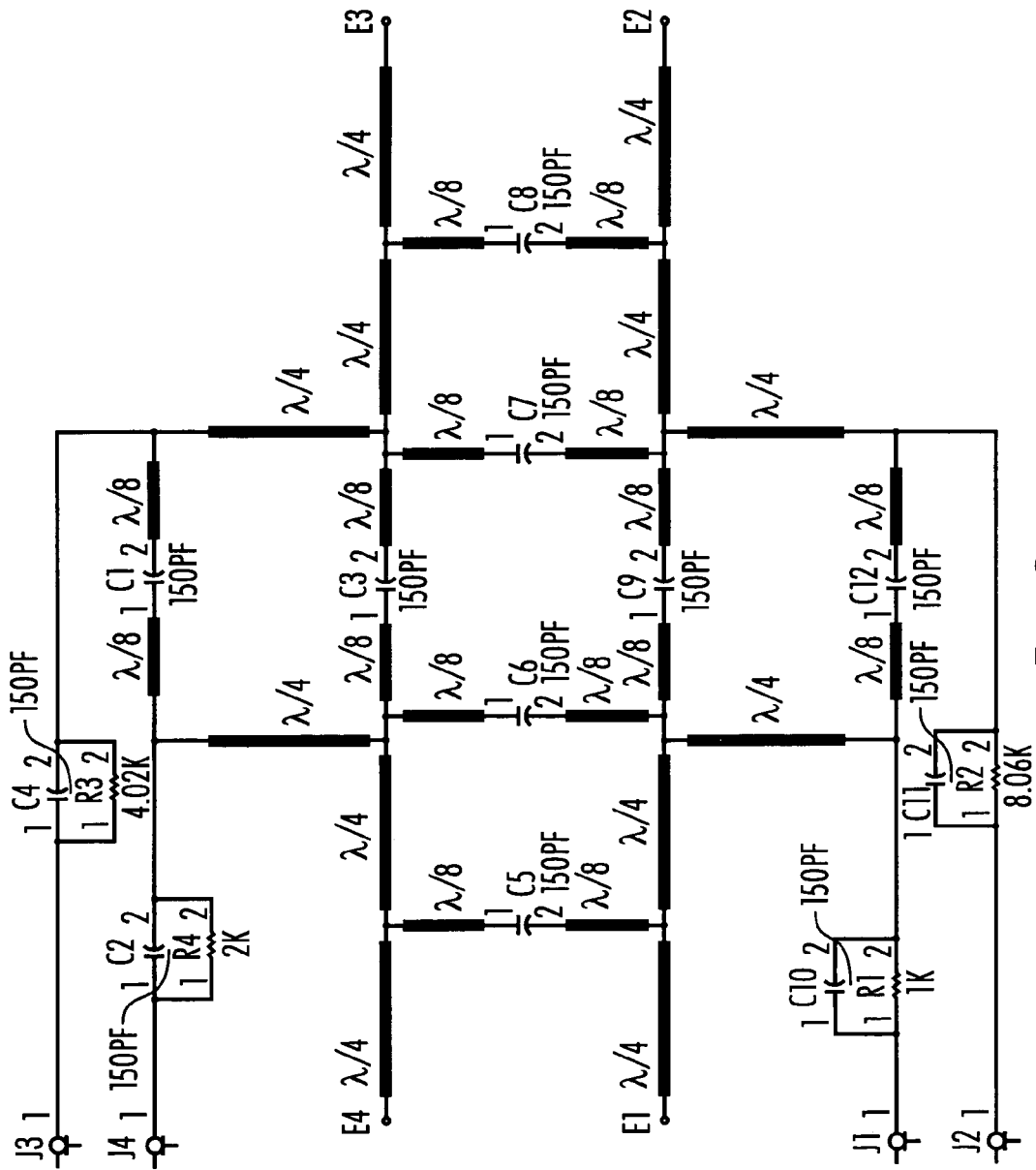
FIG. 2 depicts a schematic of a conventional antenna failure detection circuit.
Figure 3:
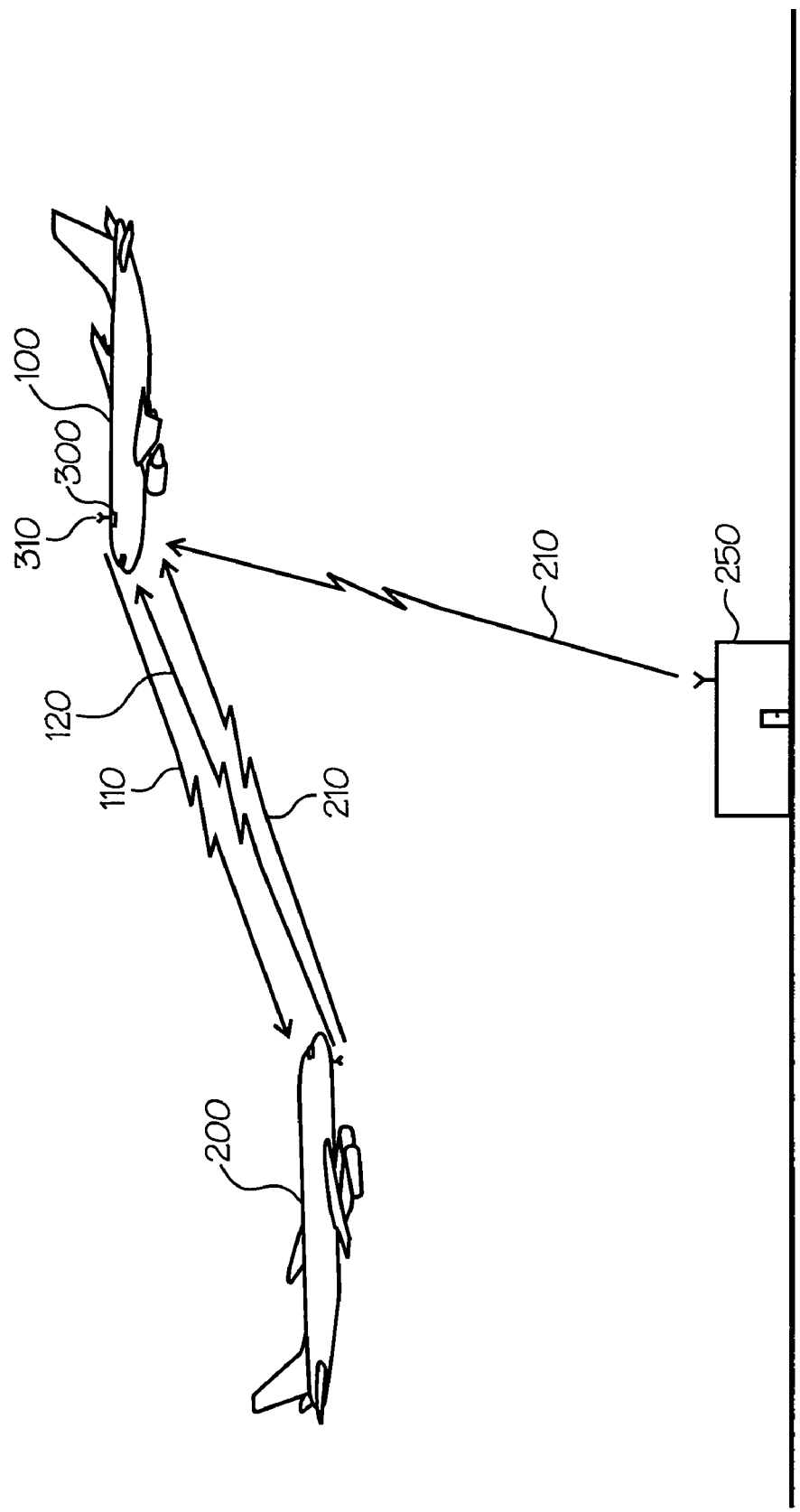
FIG. 3 depicts the typical operating environment of the invention.

The present invention provides an apparatus, method, and computer-executable program for detecting antenna failures in directional antennas. FIG. 3 depicts a typical operating environment for the invention. Host aircraft 100 includes a directional antenna system 300 which includes directional antenna 310. Host aircraft 100 is typically a commercial airliner or military aircraft, but may be any type of aircraft. Directional antenna system 300 and directional antenna 310 are used for, among other things, determining the bearing of other aircraft, such as target aircraft 200. Preferably, directional antenna system 300 is a Traffic Alert Collision Avoidance System (TCAS), however this invention is applicable to any type of directional antenna system. Bearings to target aircraft 200 are determined by sending an interrogation 110 and receiving a reply 120 utilizing the directional antenna system 300. Additionally, positional data 210 concerning target aircraft 200 may be received by host aircraft 100 from target aircraft 200 or from some other source, such as ground station 250.

In general, the present invention utilizes received positional data 210 concerning target aircraft 200 to calculate a bearing to that aircraft. This calculated bearing is then compared to a bearing that is determined using directional antenna system 300. If the difference between these two bearings is greater than some predetermined amount, it is determined that directional antenna 310 has failed.

Figure 4:
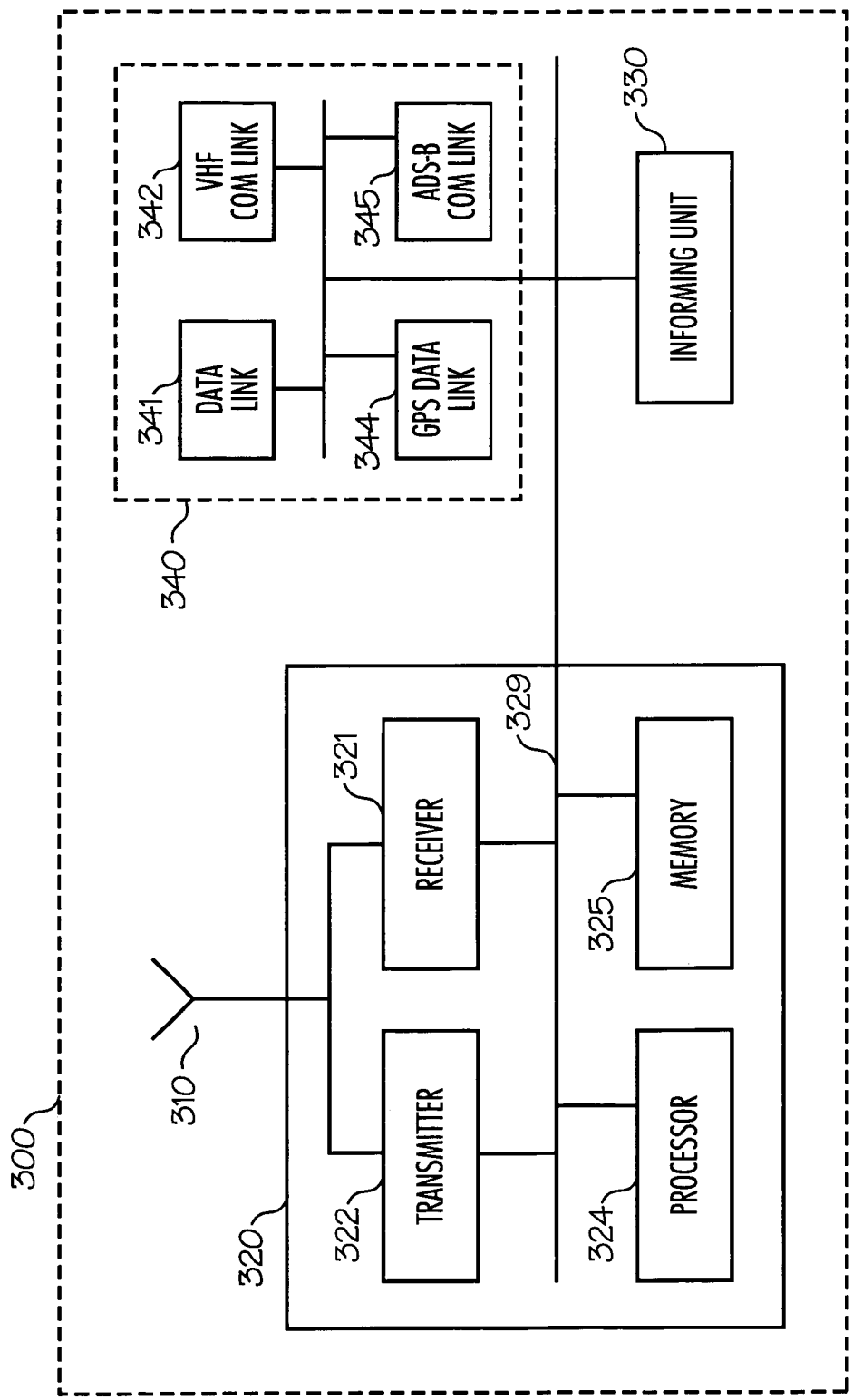
FIG. 4 depicts a block diagram of the apparatus according to one embodiment of the invention.

FIG. 4 depicts one embodiment of an apparatus according to the invention. The directional antenna system 300 includes a directional antenna 310, a computer unit 320, and an informing unit 330. Directional antenna system 300 may also optionally include additional communication links 340, including a data link 341, a VHF communication link 342, a GPS data link 344, and/or an ADS-B communication link 345. Communication among and between computer unit 320, informing unit 330, and communication links 340 is handled via bus 329.

Directional antenna 310 is preferably a TCAS directional antenna, however, as discussed above, the present invention is applicable for use with any type of directional antenna. Directional antenna 310 is coupled to the directional antenna system 300 for use by receiver 321 and/or transmitter 322. For example, directional antenna 310 may include an assembly mounted outside the fuselage (e.g., attached to the fuselage of host aircraft 100 and coupled to directional antenna system 300 by one or more cables) on the top and/or the bottom of the fuselage. An antenna assembly mounted on the top of the fuselage may be used in conjunction with or in place of a second antenna assembly on the bottom of the fuselage. Directional antenna 310 and receiver 321 may cooperate for directional reception. For example, directional antenna 310 may include any conventional directional antenna and/or elements that may be operated for directional reception (e.g., amplitude monopulse or phase monopulse reception). One such technique for directional reception is described in "Systems and Methods for Determining Bearing" by Mark D. Smith (U.S. patent application Ser. No. 10/889,983 filed Jul. 12, 2004) which is hereby incorporated by reference.

Figure 6:
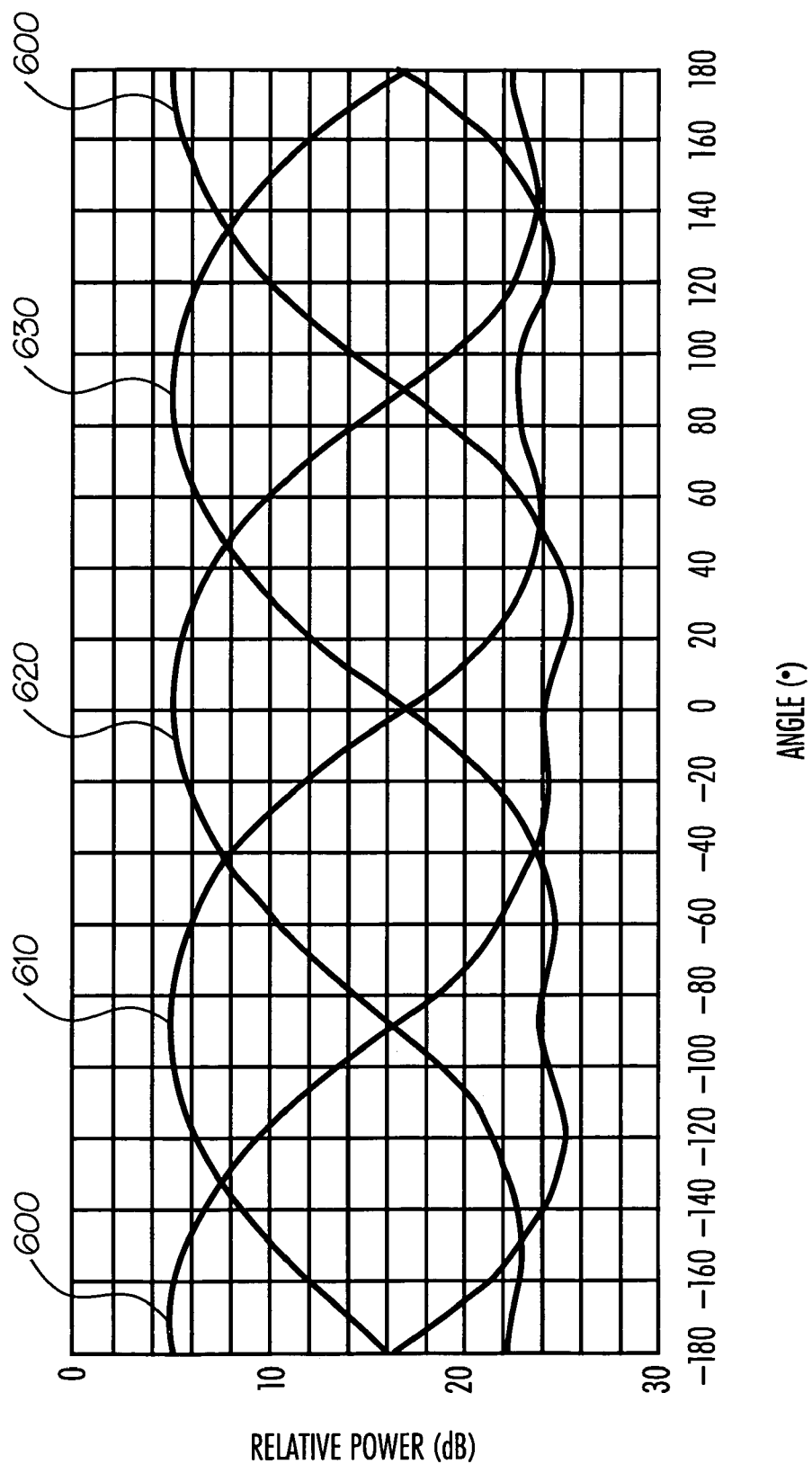
FIG. 6 is a graph of a conventional directional antenna pattern.

As one example of directional reception, FIG. 6 illustrates the radiation pattern of a conventional directional antenna of the type used in an amplitude monopulse system. Such an antenna typically detects in four quadrants. The signals illustrated were measured on a four foot diameter flat ground plane. This radiation pattern is desired for performance of the antenna on all aircraft. As shown, the performance of the antenna in each of the four quadrants representing aft 600, port 610, fore 620, and starboard 630 is virtually identical. To determine the bearing of a target, a conventional directional antenna system may use a model based on the radiation pattern of FIG. 6. When a target is detected via interrogation 110 and reply 120, the bearing of the target is calculated by determining which beam of beams 600, 610, 620, or 630 has the largest amplitude, determining which beam has the second largest amplitude, and taking the difference between the two. Based on this difference and the model, a bearing is determined. Bearings (uncorrected or corrected) are generally represented by an angular measurement in a plane (e.g., azimuth).

Directional antenna 310 may also be used to receive positional data 210 from other target aircraft. Positional data 210 may include information such as altitude, latitude, and longitude (e.g., absolute coordinates), or relative position to another object or vehicle (e.g., relative position of a follower aircraft in a formation). Typically, positional data 210 is in the form of an Automatic Dependent Surveillance Broadcast ("ADS-B") squitter, however the positional data may be in any format. A squitter is an unsolicited transmission of information. ADS-B squitters are typically transmitted periodically via an omni-directional antenna.

Alternatively, positional data 210 may be received through one or more additional communication links 340. For example, receiver 321 and/or processor 324 may determine positional data from messages received in any of the following ways: (a) on any conventional data link, such as data link 341 (e.g., a network among formation members, station keeping equipment); (b) in a conventional air traffic control system MODE S format; (c) in Automatic Dependent Surveillance Broadcast (ADS-B) format, either through directional antenna 310 or an alternative ADS-B communication link 345; (d) in a transponder format; or (e) via VHF communication link 342.

In addition to positional data concerning target aircrafts, it is also beneficial to determine the position of host aircraft 100. In this regard, any conventional locator may be used, such as GPS data link 344. Other implementations may include a subsystem cooperative with GLONASS satellites, a subsystem cooperative with the well known LORAN system, and/or an inertial navigation system.

The directional antenna information and the positional data that are received by directional antenna 310, as well as any positional data concerning host aircraft 100 and target aircraft 200 received by communication links 340, are processed by computer unit 320. Computer unit 320 includes a receiver 321, a transmitter 322, a processor 324, and a memory 325 each of which are connected to each other via bus 329. Both receiver 321 and transmitter 322 are coupled to directional antenna 310.

Receiver 321 is configured to receive both transponder replies 120 as well as positional data 210, such as ADS-B squitters. The received information is transmitted via bus 329 to processor 324 for further processing. Operation of receiver 321 may be independently controlled or may be controlled by processor 324.

Transmitter 322 is used to transmit directional antenna interrogations 110. Operation of transmitter 322 may be independently controlled or may be controlled by processor 324.

Processor 324 includes any circuit that performs a method that may be recalled from memory and/or performed by logic circuitry. The circuit may include conventional logic circuit(s), controller(s), microprocessor(s), and state machine(s) in any combination. The method may be implemented in circuitry, firmware, and/or software. Any conventional circuitry may be used (e.g., multiple redundant microprocessors, application specific integrated circuits). For example, processor 324 may include an Intel PENTIUM® microprocessor or a Motorola POWERPC® microprocessor. Processor 324 cooperates with memory 325 to perform methods for detecting directional antenna failures as discussed herein. Processor 324 provides controls and receives status from receiver 321 and transmitter 322. Use of antenna 310 by receiver 321 and transmitter 322 may be coordinated in any conventional manner by processor 324 and/or somewhat independently of processor 324 by each of receiver 321 and transmitter 322.

Memory 325 is used for storing data and program instructions in any suitable manner. Memory 325 may provide volatile and/or nonvolatile storage using any combination of conventional technology (e.g., semiconductors, magnetics, optics) in fixed and replaceable packaging. For example, memory 325 may include random access storage for working values and persistent storage for program instructions and configuration data. Programs and data may be received by and stored in system 300 in any conventional manner.

Directional antenna system 300 also includes an informing unit 330. Informing unit 330 provides information to a flight crew member in audio and/or visual format. For example, informing unit 330 presents, among other things, bearing to each of several targets as determined by computer unit 320. Informing unit 330 may include any conventional display (e.g., a VSI/TRA display). Computer unit 320 provides suitable signals to informing unit 330 for the display of bearing. Informing unit 330 may also issue traffic advisories and/or resolution advisories as directed by computer 320. In addition, informing unit 330 issues a warning if computer 320 determines that there is a directional antenna failure. The warning may be either audible or visual. In addition to the warning, computer unit 320 will typically disable any display of directional reception on informing unit 330 in the case that an antenna failure has been detected.

Figure 5:
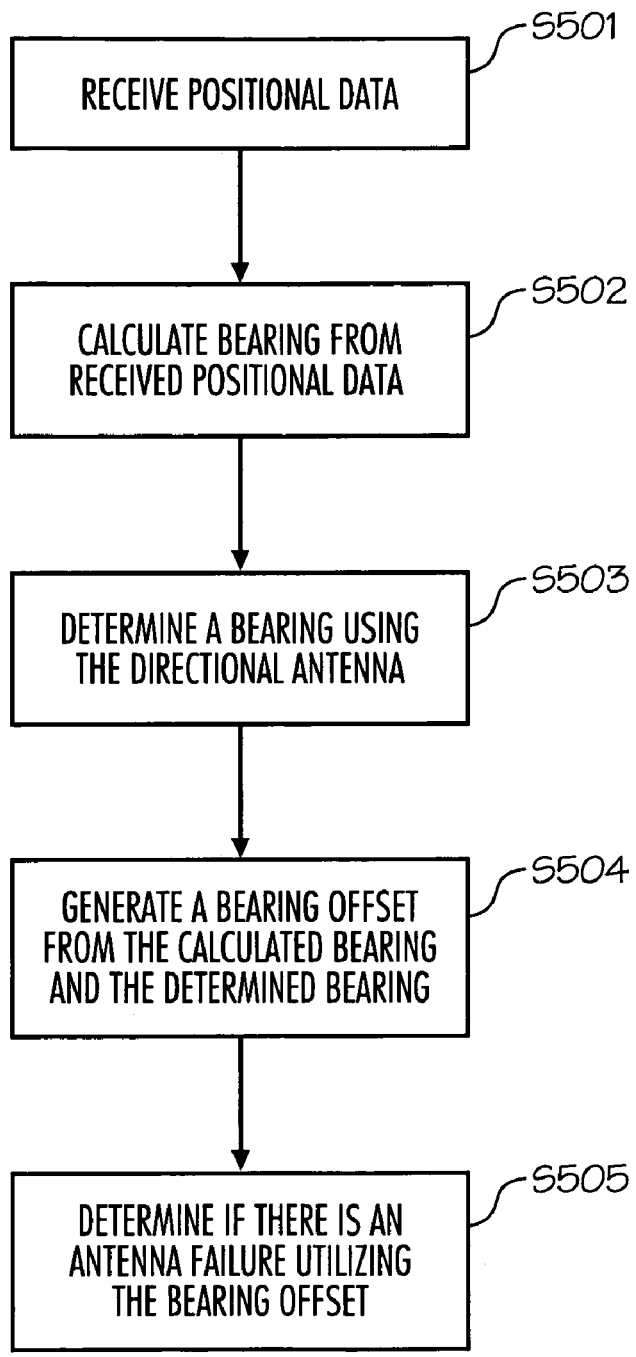
FIG. 5 depicts a flowchart showing the method steps according to one embodiment of the invention.

FIG. 5 depicts an embodiment of the method used to detect a directional antenna failure. The process for checking for an antenna failure is triggered by the receipt of positional data in step S501. For example, the positional data may be received by directional antenna 310 in the form of an ADS-B squitter from target aircraft 200. The ADS-B squitter may include information such as altitude, latitude, and longitude (e.g., absolute coordinates). Alternatively, similar information may be received over data link 341 or VHF communication link 342. These communication links may be used in situations where the target aircraft does not have an ADS-B transponder. Instead, the target aircraft may transmit positional data over a general data link or a VHF communication link. In addition, positional data of target aircrafts may also be transmitted from a ground station to data link 341 or VHF communication link 342. ADS-B squitters may also be received via a separate ADS-B communication link 345 in addition to or in place of directional antenna 310.

Next, in step S502, processor 324 receives the positional data of the target aircraft and calculates a bearing to the target aircraft. The bearing is calculated from the received positional data and the positional data of the host aircraft. As discussed above, the host aircraft's positional data may be determined, for example, with information received via a GPS data link 344. Positional data 210 concerning the target aircraft as well as the host aircraft's positional data are transmitted to processor 324 via bus 329. Processor 324 utilizes the positions of each of the aircrafts to calculate a bearing, represented, for example, as an angular measurement in a plane, to the target aircraft. This bearing is referred to as the "calculated bearing."

In step S503, a bearing to the target aircraft (i.e., the aircraft for which the positional data was received) is determined using directional antenna 310. As explained above, directional reception may be achieved using any conventional manner. Typically, the resulting bearing is represented as an angular measurement in a plane. This bearing is referred to as the "determined bearing."

In step S504, the bearing calculated from the positional data is compared to the bearing determined by the directional antenna. The bearings are subtracted to generate a bearing offset. The bearing offset is stored in memory 325.

In step S505, based on the generated bearing offset, it is determined if there is an antenna failure. This determination may be done in several ways. One way to determine if there is an antenna failure is to simply compare the bearing offset generated in step S504 to a predetermined error threshold. For example, an absolute bearing offset value of greater than 20 degrees would signify an antenna failure, however any suitable error threshold may be used.

However, as one would typically expect some error in both the directional antenna determination of bearing and in the calculation of bearing from two pieces of positional data, more accuracy for determining antenna failure may be achieved by looking at a historical record of bearing offsets rather than just one bearing offset. In this regard, another way to determine if there is an antenna failure is to compare the currently calculated bearing offset with bearing offsets that have been previously stored in memory 325. For example, an increase in bearing offset from consecutively generated bearing offsets may indicate an antenna failure. As before, the error threshold between consecutive bearing offsets may be any suitable value. For example, a change in bearing offset of 20 degrees may be used to indicate an antenna failure.

In addition to determining antenna failures from consecutive bearing offsets, it may also be beneficial to compare a current bearing offset to bearing offsets generated further back in time. For example, it may beneficial to compare the current bearing offset to the previously generated bearing offset, as well as the bearing offsets generated from fifth, tenth, and twentieth previously calculated bearing offsets. This would allow for detection of antenna failure in the situation of gradual antenna failure. In such situations, any two consecutive bearing offsets may not produce a difference that is greater than an error threshold (e.g., 20 degrees). However, the current bearing offset may be considerably greater or less than bearing offsets generated further back in time. Comparison to these older bearing offsets would then allow for detection of such a gradual antenna failure.

Determination of an antenna failure need not be limited to the comparison of individual bearing offsets, but may also include a comparison made between averages of bearing offsets. For instance, a running average of current bearing offsets may be compared to a running average of bearing offsets generated at a point further back in time. As one example, a running average of the twenty most current bearing offsets ($t_0$ to $t_{-19}$) may be compared to a running average of twenty bearing offsets that were previously generated (e.g. $t_{-100}$ to $t_{-119}$). A difference between the current and previously calculated running averages that is greater than some predetermined error threshold (e.g. 20 degrees) would indicate an antenna failure. As such, by comparing a current running average of bearing offsets against a previously generated running average, the determination of antenna failures would include a "filtering" capability so that an antenna failure would not be determined based on a single bad bearing offset or "glitch."

As described above, all individual bearing offsets and averages of bearing offsets, without consideration of which quadrant of the directional antenna received reply 120, are compared to each other for determination of an antenna failure. However, it may be beneficial to limit comparisons of bearing offsets to offsets that were generated from bearings determined by the directional antenna in a predefined arc of the antenna's coverage. In this way, the 360 degree azimuth coverage may be split up into smaller sections to cover a smaller segment of the antenna performance, and as such, detection of antenna failures may be pinpointed to specific antenna quadrants. For example, this technique would cover the case where a capacitor failure only affects one beam (i.e. quadrant of the antenna), so that a number of "good" offsets are not averaged with a failed offset, thus failing to detect a failure.

The 360 degree azimuth coverage of the antenna can be broken into any number of segments. In such cases, only bearing offsets (or averages of bearing offsets) generated from bearings determined to be in a certain segment will be compared to each other for the purposes of detecting antenna failures. As one example, bearing offsets may be separated into four equal groups as there are generally four antenna quadrants in conventional directional antennas. As another example, bearing offsets may be separated in eight equal groups about the 360 degree azimuth coverage to reflect the eight regions of antenna response of a conventional directional antenna (see FIG. 6). However, any grouping of bearing offsets for comparison may be used.

As discussed above, the method for detecting antenna failures may be implemented in circuitry, firmware, and/or software. For example, any conventional circuitry may be used (e.g., multiple redundant microprocessors, application specific integrated circuits). The circuitry may include conventional logic circuit(s), controller(s), microprocessor(s), and state machine(s) in any combination. In addition, to hardwired circuitry and/or firmware, the method may be implemented as a software program stored in memory 325 and executed by processor 324 or by any conventional method utilizing software.

Other embodiments of the invention will be apparent to those skilled in the art from consideration of the specification and embodiments disclosed herein. Thus, the specification and examples are exemplary only, with the true scope and spirit of the invention set forth in the following claims and legal equivalents thereof.

What is claimed is:

1. A method of detecting a failure of a directional antenna, the method comprising the steps of:
   receiving positional data concerning a target;
   calculating a bearing to a target with the received positional data;
   determining a bearing of the target utilizing directional reception;
   generating a bearing offset, the bearing offset being the difference between the calculated bearing and the determined bearing; and
   informing of an antenna failure in the case that the bearing offset is greater than a predetermined error threshold.

2. The method of claim 1, wherein the positional data is received from the target.

3. The method of claim 1, wherein the positional data is received from a source other than the target.

4. The method of claim 1, wherein the received positional data is in ADS-B format.

5. The method of claim 1, wherein directional reception is achieved using a TCAS directional antenna.

6. A method of detecting a failure of a directional antenna, the method comprising the steps of:
   receiving a plurality of positional data points concerning a target;
   calculating a plurality of bearings to the target with the plurality of positional data points;
   determining a plurality of bearings of the target utilizing directional reception;
   generating a plurality of bearing offsets, the bearing offsets being the difference between the calculated bearings and the determined bearings; and
   informing of an antenna failure in the case that a current bearing offset differs from a previously generated bearing offset by an amount greater than a predetermined error threshold.

7. The method of claim 6, wherein the positional data points are received from the target.

8. The method of claim 6, wherein the positional data points are received from a source other than the target.

9. The method of claim 6, wherein the received positional data points are in ADS-B format.

10. The method of claim 6, wherein directional reception is achieved using a TCAS directional antenna.

11. The method of claim 6, wherein the current bearing offset and the previously generated bearing offset are consecutively generated bearing offsets.

12. The method of claim 6, wherein bearing offsets are divided into different groups based on a region of the directional antenna from which the determined bearings were received, and wherein the informing step compares bearing offsets within their respective groups.

13. A method of detecting a failure of a directional antenna, the method comprising the steps of:
   receiving a plurality of positional data points concerning a target;
   calculating a plurality of bearings to the target with the plurality of positional data points;
   determining a plurality of bearings of the target utilizing directional reception;
   generating a plurality of bearing offsets, the bearing offsets being the difference between the calculated bearings and the determined bearings; and
   informing of an antenna failure in the case that a current running average of bearing offsets differs from a previously generated running average of bearing offsets by an amount greater than a predetermined error threshold.

14. A computer-executable program stored on a computer-readable medium, the program for detecting a failure of a directional antenna, the program comprising:
   a receiving code for receiving positional data concerning a target;
   a calculating code for calculating a bearing to the target with the received positional data;
   a determining code for determining a bearing of the target utilizing directional reception;
   a generating code for generating a bearing offset, the bearing offset being the difference between the calculated bearing and the determined bearing; and
   an informing code for informing of an antenna failure in the case that the bearing offset is greater than a predetermined error threshold.

15. The program of claim 14, wherein the positional data is received from the target.

16. The program of claim 14, wherein the positional data is received from a source other than the target.

17. The program of claim 14, wherein the received positional data is in ADS-B format.

18. The program of claim 14, wherein directional reception is achieved using a TCAS directional antenna.

19. A computer-executable program stored on a computer-readable medium, the program for detecting a failure of a directional antenna, the program comprising:
   a receiving code for receiving a plurality of positional data points concerning a target;
   a calculating code for calculating a plurality of bearings to the target with the plurality of positional data points;
   a determining code for determining a plurality of bearings of the target utilizing directional reception;

a generating code for generating a plurality of bearing offsets, the bearing offsets being the difference between the calculated bearings and the determined bearings; and an informing code for informing of an antenna failure in the case that a current bearing offset differs from a previously generated bearing offset by an amount greater than a predetermined error threshold.

20. The program of claim 19, wherein the positional data points are received from the target.

21. The program of claim 19, wherein the positional data points are received from a source other than the target.

22. The program of claim 19, wherein the received positional data points are in ADS-B format.

23. The program of claim 19, wherein directional reception is achieved using a TCAS directional antenna.

24. The program of claim 19, wherein the current bearing offset and the previously generated bearing offset are consecutively generated bearing offsets.

25. The program of claim 19, wherein bearing offsets are divided into different groups based on a region of the directional antenna from which the determined bearings were received, and wherein the informing code compares bearing offsets within their respective groups.

26. A computer-executable program stored on a computer-readable medium, the program for detecting a failure of a directional antenna, the program comprising:

a receiving code for receiving a plurality of positional data points concerning a target;

a calculating code for calculating a plurality of bearings to the target with the plurality of positional data points;

a determining code for determining a plurality of bearings of the target utilizing directional reception;

a generating code for generating a plurality of bearing offsets, the bearing offsets being the difference between the calculated bearings and the determined bearings; and an informing code for informing of an antenna failure in the case that a current running average of bearing offsets differs from a previously generated running average of bearing offsets by an amount greater than a predetermined error threshold.

27. An apparatus for detecting a failure of a directional antenna, the apparatus comprising:

a receiver for receiving positional data concerning a target;

a calculating unit for calculating a bearing to the target with the received positional data;

a directional antenna for determining a bearing of the target;

a generating unit connected to the calculating unit and the directional antenna, the generating unit for generating a bearing offset, the bearing offset being the difference between the calculated bearing and the determined bearing; and an informing unit connected to the comparing unit, the informing unit for informing of an antenna failure in the case that the bearing offset is greater than a predetermined error threshold.

28. The apparatus of claim 27, wherein the receiver receives the positional data from the target.

29. The apparatus of claim 27, wherein the receiver receives the positional data from a source other than the target.

30. The apparatus of claim 27, wherein the received positional data is in ADS-B format.

31. The apparatus of claim 27, wherein the directional antenna is a TCAS directional antenna.

32. An apparatus for detecting a failure of a directional antenna, the apparatus comprising:

a receiver for receiving a plurality of positional data points concerning a target;

a calculating unit for calculating a plurality of bearings of the target with the plurality of positional data points;

a directional antenna for determining a plurality of bearings of the target;

a generating unit connected to the receiver and the directional antenna, the generating unit for generating a plurality of bearing offsets, the bearing offsets being the difference between the calculated bearings and the determined bearings; and an informing unit connected to the generating unit, the informing unit for informing of an antenna failure in the case that a current bearing offset differs from a previously generated bearing offset by an amount greater than a predetermined error threshold.

33. The apparatus of claim 32, wherein the receiver receives positional data points from the target.

34. The apparatus of claim 32, wherein the receiver receives positional data from a source other than the target.

35. The apparatus of claim 32, wherein the received positional data points are in ADS-B format.

36. The apparatus of claim 32, wherein the directional antenna is a TCAS directional antenna.

37. The apparatus of claim 32, wherein the current bearing offset and the previously generated bearing offset are consecutively generated bearing offsets.

38. The apparatus of claim 32, wherein bearing offsets are divided into different groups based on a region of the directional antenna from which the determined bearings were received, and wherein the informing unit compares bearing offsets within their respective groups.

39. An apparatus for detecting a failure of a directional antenna, the apparatus comprising:

a receiver for receiving a plurality of positional data points concerning a target;

a calculating unit for calculating a plurality of bearings of the target with the plurality of positional data points;

a directional antenna for determining a plurality of bearings of the target;

a generating unit connected to the receiver and the directional antenna, the generating unit for generating a plurality of bearing offsets, the bearing offsets being the difference between the calculated bearings and the determined bearings; and an informing unit connected to the generating unit, the informing unit for informing of an antenna failure in the case that a current running average of bearing offsets differs from a previously generated running average of bearing offsets by an amount greater than a predetermined error threshold.

\* \* \* \* \*